US009337913B2

(12) United States Patent
Shapira et al.

(10) Patent No.: US 9,337,913 B2
(45) Date of Patent: May 10, 2016

(54) REPEATER FOR ENHANCING PERFORMANCE OF A WIRELESS LAN NETWORK

(75) Inventors: Nir Shapira, Ra'anana (IL); Oren Hencinski, Holon (IL)

(73) Assignee: Celeno Communications Ltd., Raanana (IL)

( * ) Notice: Subject to any disclaimer, the term of this patent is extended or adjusted under 35 U.S.C. 154(b) by 0 days.

(21) Appl. No.: 13/523,365

(22) Filed: Jun. 14, 2012

(65) Prior Publication Data

US 2013/0003645 A1 Jan. 3, 2013

Related U.S. Application Data

(60) Provisional application No. 61/497,230, filed on Jun. 15, 2011.

(51) Int. Cl.
*H04W 88/08* (2009.01)
*H04W 88/04* (2009.01)
*H04W 72/04* (2009.01)
*H04B 7/155* (2006.01)
*H04W 84/12* (2009.01)

(52) U.S. Cl.
CPC ........ *H04B 7/15507* (2013.01); *H04B 7/15542* (2013.01); *H04W 84/12* (2013.01)

(58) Field of Classification Search
CPC ... H04W 84/12; H04W 88/08; H04W 88/085; H04W 40/22; H04W 88/00; H04W 16/20; H04B 7/14; H04B 7/15; H04B 7/145; H04B 7/15507; H04B 7/15571; H04B 10/29; H04B 7/15542

USPC ...................................... 370/315; 455/7, 11.1
See application file for complete search history.

(56) References Cited

U.S. PATENT DOCUMENTS

| 2004/0146013 | A1* | 7/2004 | Song et al. ..................... 370/279 |
| 2006/0098592 | A1* | 5/2006 | Proctor, Jr. et al. ........... 370/315 |
| 2006/0265479 | A1* | 11/2006 | Runaker ........................ 709/220 |
| 2006/0280138 | A1* | 12/2006 | Nanda et al. .................. 370/315 |
| 2007/0015462 | A1* | 1/2007 | Dean et al. ...................... 455/15 |
| 2009/0201846 | A1* | 8/2009 | Horn et al. .................... 370/315 |
| 2010/0061313 | A1* | 3/2010 | Park .............................. 370/329 |
| 2010/0165910 | A1* | 7/2010 | Mathews ........... H04B 7/15528 370/315 |
| 2011/0130163 | A1* | 6/2011 | Saban et al. ................... 455/517 |

OTHER PUBLICATIONS

"IEEE-Std 802.11, 1999 Edition (ISO/IEC 8802-11: 1999)".
(Continued)

*Primary Examiner* — Ahmed Elallam
(74) *Attorney, Agent, or Firm* — Pearl Cohen Zedek Latzer Baratz LLP

(57) ABSTRACT

System and method for enhancing performance of a wireless communication system, including communicating between an access point and at least one close client over a first RF channel, and communicating between an access point and at least one remote client via a repeater. The communication between the access point and the at least one remote client via the repeater includes communicating between an access point and the repeater over the first RF channel and communicating between the repeater and the at least one remote client over a second RF channel. The communication between the access point and the at least one close client over the first RF channel is substantially contemporaneous with the communication between the repeater and the at least one remote client over the second RF channel.

21 Claims, 4 Drawing Sheets

(56) References Cited

OTHER PUBLICATIONS

"IEEE-Std 802.11b-1999, Supplement to 802.11-1999, Wireless LAN MAC and PHY specifications: Higher speed Physical Layer (PHY) extension in the 2.4 GHz band".
"IEEE-Std 802.11a-1999, Higher speed Physical Layer (PHY) extension in the 5 GHz band".
"IEEE Std 802.11n-2009," IEEE 802.11ac standard.

* cited by examiner

REPEATER FOR ENHANCING PERFORMANCE OF A WIRELESS LAN NETWORK

CROSS REFERENCE TO RELATED APPLICATIONS

This application claims the benefit of U.S. Provisional Application Ser. No. 61/497,230, filed on Jun. 15, 2011 and entitled NOVEL REPEATER ARCHITECTURE, the entire content of which is incorporated herein by reference.

FIELD OF THE INVENTION

The present invention relates to the field of wireless communication. In particular, embodiments of the present invention relate to a method and apparatus for increasing the reach of a wireless network.

BACKGROUND OF THE INVENTION

Coverage of wireless LAN (WLAN) networks is typically limited due to attenuation of the Radio Frequency (RF) signal. The higher the frequency of the RF wireless signal, the higher is its attenuation. For example, a 5 GHz access point (AP) transmitter may cover less area than a 2.4 GHz AP. In addition, the higher frequency wireless signals of 5 GHz networks do not penetrate solid objects such as walls as well as do 2.4 GHz signals, limiting their reach inside homes.

Wireless repeaters may be used to increase the range and therefore the coverage of a wireless network. For example, repeaters may provide connectivity to remote areas that are found outside the range of the AP. For example, areas in which the intensity of the RF signal is to low to be properly received by a wireless station (STA).

Many home or small office installations include a single AP that may not fully cover the entire area where users need connectivity. Placing a repeater between the covered and uncovered areas, however, will provide connectivity throughout the entire space.

Some known repeaters receive and retransmit frames on the same RF channel. This reduces throughput on the WLAN, since the AP cannot transmit contemporaneously with the retransmission by the repeater. Other known repeaters receive and retransmit continuously on separate RF channels. For example, repeaters may receive signals on 5 GHz RF channel and retransmit on 5.96 GHz channel. Receiving and retransmitting contemporaneously on separate RF channels requires The use of two separate radio devices. Typically, the two signals from the two radios interfere with each other, and hence, complicated filtering of the two signals is required to provide sufficient signal quality.

SUMMARY OF THE INVENTION

According to embodiments of the present invention, there is provided a wireless communication system. The wireless communication system may include a repeater; a remote client; and an access point to communicate with at least one close client over a first RF channel, and with the remote client via the repeater; wherein the repeater may be configured to communicate with the access point over the first RF channel and to communicate with the remote client over a second RF channel, and wherein communication between the access point and the at least one close client over the first RF channel may be substantially contemporaneous with the communication between the repeater and the remote client over the second RF channel.

Furthermore, according to embodiments of the present invention, the access point may be configured to allocate the first RF channel and the second RF channel dynamically.

Furthermore, according to embodiments of the present invention, the access point may be configured to allocate the first RF channel and the repeater may be configured to allocate the second RF channel dynamically.

Furthermore, according to embodiments of the present invention, the access point may be configured to allocate the first RF channel and the second RF channel to any free channels in a frequency band.

Furthermore, according to embodiments of the present invention, the first RF channel and the second RF channel may be adjacent channels.

Furthermore, according to embodiments of the present invention, the repeater may include a single radio unit, and the repeater may communicate with the access point over the first RF channel and with the remote client over the second RF channel using the single radio unit, using time slot multiplexing.

According to embodiments of the present invention, there is provided a method for enhancing performance of a wireless communication system, the method may include: communicating between an access point and at least one close client over a first RF channel; and communicating between an access point and at least one remote client via a repeater, the communication between the access point and the at least one remote client via the repeater may include: communicating between an access point and the repeater over the first RF channel; and communicating between the repeater and the at least one remote client over a second RF channel; wherein communication between the access point and the at least one close client over the first RF channel may be substantially contemporaneous with the communication between the repeater and the at least one remote client over the second RF channel.

Furthermore, according to embodiments of the present invention, the method may include dynamically allocating the first RF channel and the second RF channel.

Furthermore, according to embodiments of the present invention, the method may include allocating the first RF channel and the second RF channel, each to any free channel in a frequency band.

Furthermore, according to embodiments of the present invention, the first RF channel and the second RF channel may be adjacent channels.

Furthermore, according to embodiments of the present invention, the repeater may communicate with the access point over the first RF channel and with the at least one remote client over the second RF channel using a single radio unit.

Furthermore, according to embodiments of the present invention, the method may include coordinating by the repeater with the access point moving from communicating by the repeater with the access point over the first RF channel to communicating by the repeater with the at least one remote client over the second RF channel.

Furthermore, according to embodiments of the present invention, the method may include notifying the access point by the repeater that the repeater is in power save mode when the repeater moves from communicating with the access point over the first RF channel to communicating with the at least one remote client over the second RF channel.

According to embodiments of the present invention, there is provided a method for repeating a wireless signal in a wireless communication system, the method may include: communicating by a repeater with an access point over a first RF channel, including receiving from the access point data intended to an at least one remote client and forwarding data intended to the access point to the access point; and communicating by the repeater with the at least one remote client over a second RF channel, including receiving from the at least one remote client the data intended to the access point and forwarding the data intended to the at least one remote client to the at least one remote client, wherein communicating with the access point over the first RF channel and communicating with the at least one remote client over the second RF channel may be performed by the repeater in different time slots.

According to some embodiments of the present invention, the steps of communicating with the access point over the first RF channel and communicating with the at least one remote client over the second RF channel are performed by the repeater using a single radio unit.

Furthermore, according to embodiments of the present invention, communication between the access point and an at least one close client over the first RF channel may be substantially contemporaneous with the communication with the at least one remote client over the second RF channel by the repeater.

Furthermore, according to embodiments of the present invention, the method may include coordinating with the access point moving from communicating by the repeater with the access point over the first RF channel to communicating with the at least one remote client over the second RF channel.

Furthermore, according to embodiments of the present invention, the method may include notifying the access point that the repeater is in power save mode when the repeater moves from communicating with the access point over the first RF channel to communicating with the at least one remote client over the second RF channel.

Furthermore, according to embodiments of the present invention, the method may include allocating by the repeater the second RF channel dynamically and allocating by the access point the first RF channel dynamically.

According to embodiments of the present invention, there is provided a repeater. The repeater may include: a processor; and a computer usable medium connected to the processor, wherein the computer usable medium contains a set of instructions for repeating a wireless signal in a wireless communication system, wherein the processor is designed to carry out a set of instructions to perform a method of: communicating with an access point over a first RF channel, wherein communicating comprises receiving from the access point data intended to an at least one remote client and forwarding data intended to the access point to the access point; and communicating with the at least one remote client over a second RF channel, wherein communicating comprises receiving from the at least one remote client the data intended to the access point and forwarding the data intended to the at least one remote client to the at least one remote client, wherein communicating with the access point over the first RF channel and communicating with the at least one remote client over the second RF channel may performed by the repeater in different time slots.

Furthermore, according to embodiments of the present invention, the repeater may include: a single radio unit, wherein communicating with the access point over the first RF channel and communicating with the at least one remote client over the second RF channel may be performed by the repeater using a single radio unit.

Furthermore, according to embodiments of the present invention, communication between the access point and an at least one close client over the first RF channel may be substantially contemporaneous with the communication with the at least one remote client over the second RF channel, by the repeater.

Furthermore, according to embodiments of the present invention, the instructions when executed may further perform a method of coordinating with the access point moving from communicating by the repeater with the access point over the first RF channel to communicating with the at least one remote client over the second RF channel.

Furthermore, according to embodiments of the present invention, the instructions when executed may further perform a method of notifying the access point that the repeater is in power save mode when the repeater moves from communicating with the access point over the first RF channel to communicating with the at least one remote client over the second RF channel.

Furthermore, according to embodiments of the present invention, the instructions when executed may further perform a method of allocating the second RF channel dynamically.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
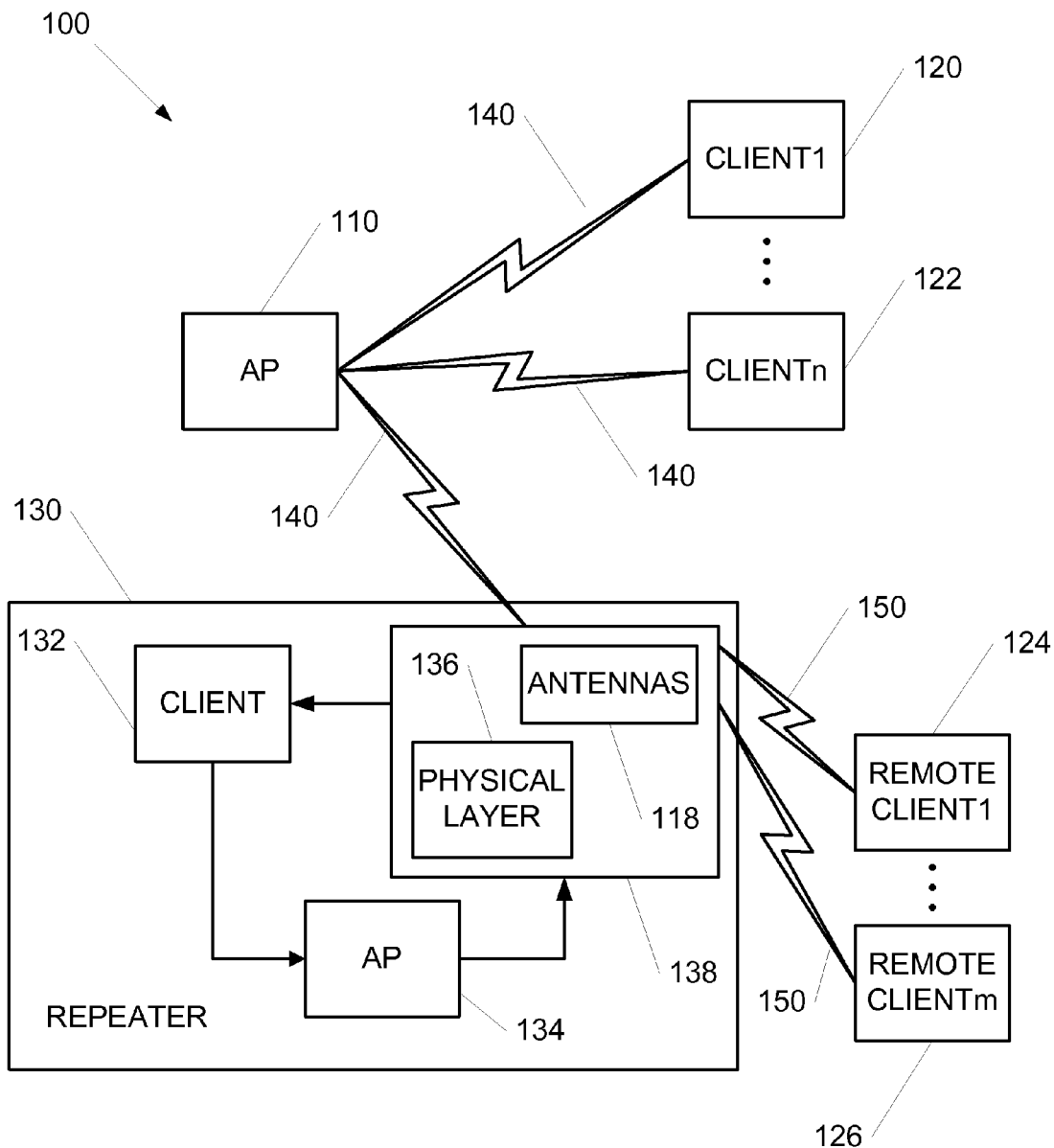
FIG. 1 is a schematic illustration of a wireless communication system including a repeater in accordance with demonstrative embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

It should be understood that the present invention may be used in a variety of applications. Although the present invention is not limited in this respect, the circuits and techniques disclosed herein may be used in many apparatuses such as wireless communication system, digital communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Reference is made to FIG. 1, which schematically illustrates a wireless communication system 100 including a repeater 130 in accordance with embodiments of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Although the scope of the present invention is not limited to this example, wireless communication system 100 may include an access point (AP) 110. AP 110 may communicate with n clients 120, 122 and to m remote clients 124, 126 via repeater 130, e.g. transmit and/or receive wireless communication signals to clients 120, 122 and to remote clients 124, 126 via repeater 130. AP 110 may transmit and/or receive various types of real time or best effort data to some or all of clients 120, 122 and remote clients 124, 126. n and m may be integers that equals one or more, representing one or more close or remote clients. A client may include a station or a repeater. For example, AP 110 may distribute real time data such as video and/or audio steams e.g. digital television (DTV) streams, high definition television (HDTV) streams, etc. For example, AP 110 may distribute three 20 Mbps HDTV streams, each stream directed to a destination client of clients 120, 122 and to remote client 124.

Clients 120, 122, 124 and 126 may include, for example, a wireless communication station or a wireless communication device capable of transmitting and/or receiving wireless communication signals. Clients 120 and 122 may be located close to AP 110, e.g., within the transmission range of AP 110. Remote clients 124 and 126 may be placed in an area that is outside the transmission range of AP 110. Therefore, a repeater 130 located within the transmission range of AP 110, in between AP 110 and remote clients 124 and 126, may be used to receive from the AP data intended to remote clients 124 and 126 and forward the remote client data to remote clients 124 and 126, and to receive from remote clients 124 and 126 data intended to AP 110 and forward the AP data to the AP 110.

Although the invention is not limited in this respect, AP 110 and clients 120, 122, 124 and 126 may include a radio unit (not shown) including an antenna or a set of N antennas (not shown). Repeater 130 may include radio unit 138 including a single physical layer unit 136 and an antenna or a set of N antennas 118. Antennas 118, as well as antennas of clients 120, 122, 124 and 126 may include an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, modules, frames, transmission streams, packets, messages and/or data.

According to embodiments of the present invention, AP 110 may communicate with clients 120 and 122 and with repeater 130 over RF channel 140. Repeater 130 may communicate with AP 110 over RF channel 140 and with remote clients 124 and 126 over a second RF channel 150 using time slot multiplexing. AP 110 may transmit data to clients 120 and 122 over RF channel 140 substantially contemporaneously with the communication between repeater 130 and remote clients 124 and 126 over channel 150.

According to some embodiments of the present invention, both RF channel 140 and RF channel 150 may operate in different channels of the same frequency band, as defined, for example in an appropriate wireless communication standard. For example, both RF channel 140 and RF channel 150 may operate in different channels of the 5 GHz band, as defined by the IEEE 802.11a standard, or in different channels of the 2.4 GHz band, as defined by the IEEE 802.11b standard. Alternatively, RF channel 140 and RF channel 150 may operate in different channels of different frequency bands, as long as the repeater 130 may communicate over the two frequency bands at different time slots, typically using single radio unit 138. For example, RF channel 140 may operate in a channel of the 5 GHz band, as defined by the IEEE 802.11a standard, while RF channel 150 may operate in a channel of the 2.4 GHz band, as defined by the IEEE 802.11b standard. It should be noted that other RF channels may be used in compliance with other wireless communication standards. Embodiments of the present invention are not limited to a specific RF frequency channel or a wireless communication standard.

According to some embodiments of the present invention, both RF channel 140 and RF channel 150 may be allocated and changed dynamically during operation of wireless communication system 100. For example, AP 110 may allocate and change both RF channel 140 and RF channel 150 dynamically. Alternatively, AP 110 may allocate and change RF channel 140 and repeater 130 may allocate and change RF channel 150 dynamically. This channel selection flexibility enables wireless communication system 100 to handle interference from neighboring networks by performing dynamic channel selection. For example, if high interference level is detected in either RF channel 140 or RF channel 150, a substitute RF channel may be allocated.

Additionally, since repeater 130 communicates with AP 110 over RF channel 140 and with remote clients 124 and 126 over RF channel 150 in different time slots, substantially no interference is expected to degrade signal quality of repeater 130. Therefore, channels 140 and 150 may be allocated to substantially any free channels in a frequency band, without substantially any inherent constrains related to physical limitations of radio unit 138. For example, channels 140 and 150 may be allocated to adjacent channels, as opposed to repeaters that communicate on two channels working simultaneously using two radio units. In the latter case, the physical proximity of the transmitter in one channel and the receiver in another channel, and the fact that the transmit/receive operations in the two channels are not coordinated, can lead to inter channel interference, e.g. the transmitted signal from the repeater in one channel can interfere with the received signal of the repeater in another channel. This is particularly significant in the case of adjacent channels. Therefore, repeaters that communicate on two channels working simultaneously using two radio units typically cannot work on adjacent channels.

Channel selection flexibility enables selecting channels without tight Federal Communications Commission (FCC) regulations constraints for both RF channel 140 and RF channel 150. In contrast, repeaters that receive and retransmit continuously on separate RF channels, and use RF filtering to reduce interference between the two channels, are forced to select one of the channels in the lower sub-band of 5.2 G, and therefore must comply with a tight FCC power limit of 17 dBm. This limit is 13 dB lower than the allowed limit in the higher sub-band. The 13 dB reduction in output power can highly degrade the performance of one of the receiver hops, by as much as 75%, and can significantly limit the overall reach of the wireless communication system. For example, according to an indoor non-line-of-sight (NLOS) path-loss model, 13 dB difference in link budget reduces reach from 23 meters to 9 meters.

Additionally, AP 110 may perform dynamic load balancing between RF channel 140 and RF channel 150, or other RF channels (not shown) that may be available to other repeaters (not shown) that may be added to wireless communication system 100, according to traffic needs and channel conditions. For example, either of clients 120, 122, 124 and 126 and repeater 130 may be commanded to momentarily switch between RF channel 140 and RF channel 150, for example, to measure link budget of clients 120, 122, 124 and 126 to both AP 110 and repeater 130. For example, AP 110 may allocate clients e.g. clients 120 and 122, to work through a repeater, e.g. repeater 130 or other repeater, for reasons of load balancing, even if clients 120 and 122 are within reach of AP 130. For example, client 120 may be located at a distance from AP 110, and may be served by AP 110 at a low bit rate relatively to the maximal bit rate of AP 110, while a repeater may serve client 120 at a high bit rate. For example, client 120 may be within reach of AP 110 when client 120 is served alone e.g. when client 120 can get all the air time of AP 110. However, if client 120 gets all the air time of AP 110, AP may not be able to serve any other client. To achieve better load balancing, AP 110 may allocate client 120 to work through a repeater, e.g. repeater 130 or a second repeater similar to repeater 130, and thus reduce the load in RF channel 140. For example, client 120 may be allocated to work through a repeater by sending client 120 a change channel command to the second channel of the chosen repeater. In order to make these load balancing decisions, AP 110 needs to know the link budget of clients 120 and 122 to the repeater in the second channel. Hence clients 120 and 122 may be commanded to momentarily switch between RF channel 140 and the second RF channel of the repeater to measure link budget of clients 120 and 122 to the repeater.

According to embodiments of the present invention, repeater 130 may act as client in RF channel 140 and as a secondary AP in RF channel 150. For example, repeater 130 may include client block 132 to communicate with AP 110 in RF channel 140, and secondary AP block 134 to communicate with remote clients 124 and 126 in RF channel 150. Repeater 130 may include a single radio unit 138 including a single antenna array 118 and a single physical layer unit 136. Repeater 130 may receive and retransmit the data intended to remote clients 124 and 126 using single radio unit 138. Single physical layer unit 136 may be implemented, for example, in a single chip in the desired band, e.g., the 5 G band. In contrary to repeaters that communicate with the AP and the remote clients continuously on separate RF channels and use two radio units, each including a physical layer unit and corresponding set of antennas, there is no need for complex filtering or RF fine-tuning. As a result, the complexity and cost of repeater 130 are low compared with complexity and cost of repeaters that communicate continuously on separate RF channels.

Figure 2:
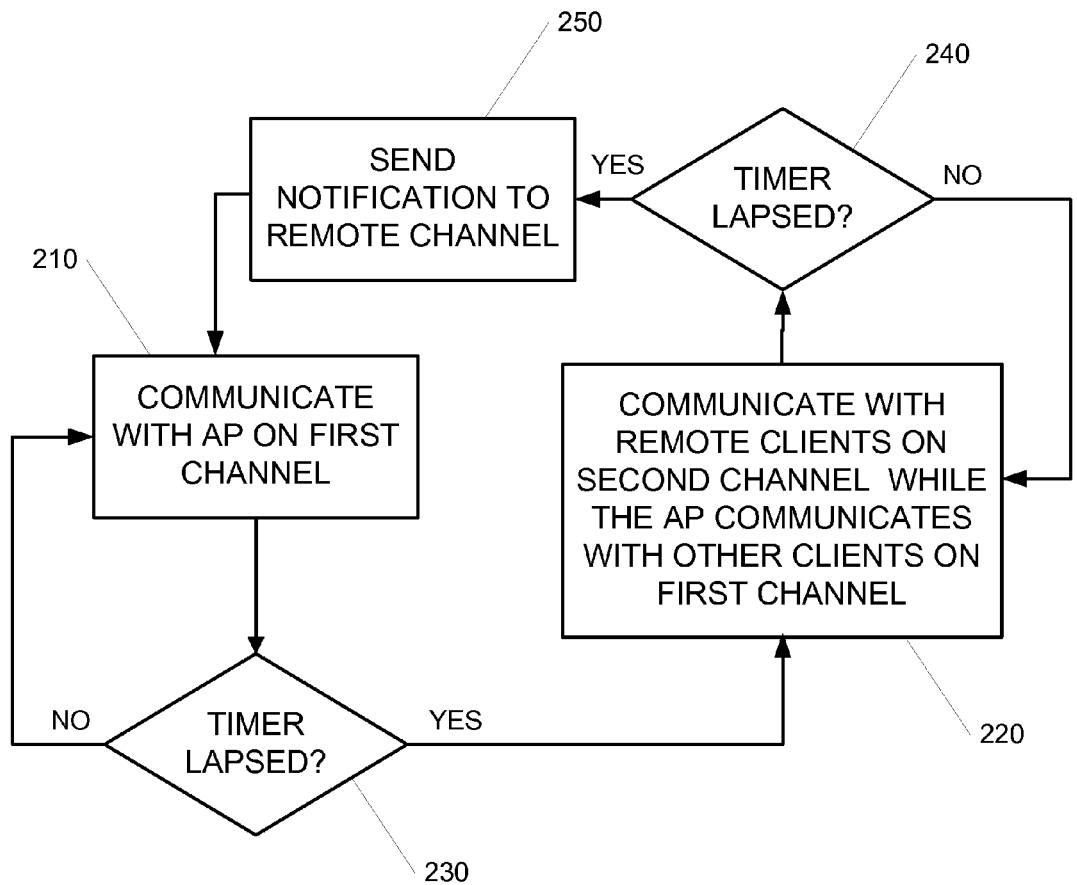
FIG. 2 is a flowchart illustration of a method for repeating data intended for a remote station by a repeater in a wireless communication system according to embodiments of the present invention.

Reference is made to FIG. 2, which is a flowchart illustration of a method for enhancing performance of a wireless communication system using repeater 130 according to embodiments of the present invention. And to FIG. 3 which is an illustration of the method presented in FIG. 2 on the time scale. In the example presented in FIG. 3, AP 110 may serve n close clients, e.g. close clients 120, 122 during time intervals t1, t2, to tn, and m remote clients, e.g. remote clients 124, 126, through repeater 130 during time interval t(n+1).

Figure 3:
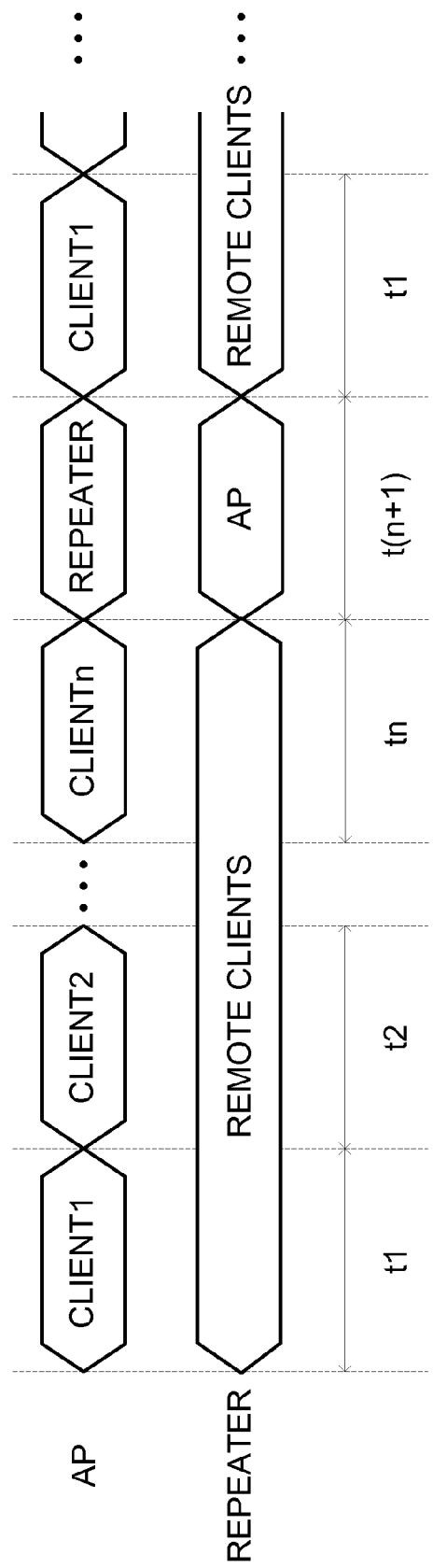
FIG. 3 is an illustration of the method presented in FIG. 3 on the time scale system according to embodiments of the present invention.

According to the method presented in FIGS. 2 and 3, repeater 130 may perform time slot multiplexing by hopping on predetermined intervals $$\sum_{i=1}^{n} t_i$$

and t(n+1) between RF channel 140 and RF channel 150. For example, time intervals t1, t2, to tn may be set to a time interval in the range of 5-10 ms to limit end-to-end delay. Time intervals t1, t2, to t(n+1) may be equal or different from each other, and may be determined according to the type of service, the required bandwidth the system needs, or any other suitable consideration. Hopping overhead may be in the order of 0.1-0.2 ms, and therefore may be considered negligible. AP 110 and repeater 130 may be coordinated regarding channel hops of repeater 130, for example, using a common timer such as a common time synchronization function (TSF) timer. Hence, AP 110 may know, substantially without any need for handshake with repeater 130, when repeater 130 is in RF channel 140 and should be served.

In block 210, repeater 130 may communicate, e.g. send and receive data, with AP 110 over RF channel 140 for a predetermined time interval t(n+1), e.g. during time interval t(n+1), repeater 130 may receive from AP 110 data intended to the remote clients 124, 126 and forward data received from remote clients 124, 126 and intended to AP 110 to AP 110. If hopping interval t(n+1) lapses, indicated as YES on block 230, repeater 130 hops to communicating with remote clients 124, 126 over RF channel 150 for time intervals t1 to tn, e.g. during time intervals t1 to tn, repeater 130 may receive from remote clients 124, 126 data intended to AP 110 and forward the data intended to remote clients 124, 126 to remote clients 124, 126, as indicated in block 220. As evident from FIG. 3, during the same time intervals t1 to tn AP 110 may communicate with clients 120 and 122 over RF channel 140. When time intervals t1 to tn lapses, indicated as YES on block 240, repeater 130 may hop to communicate with AP 110 on RF channel 140, and so forth. Before repeater 130 hops back to RF channel 140, repeater 130 may send a notification to remote clients 124, 126 to notify remote clients 124, 126 that repeater 130 momentarily leaves RF channel 150, as indicated in block 250. Thus, remote clients 124, 126 may be notified that they should not communicate with repeater 130 until repeater 130 returns to RF channel 150. For example, the notification may include a standard IEEE 802.11h action frame.

Figure 4:
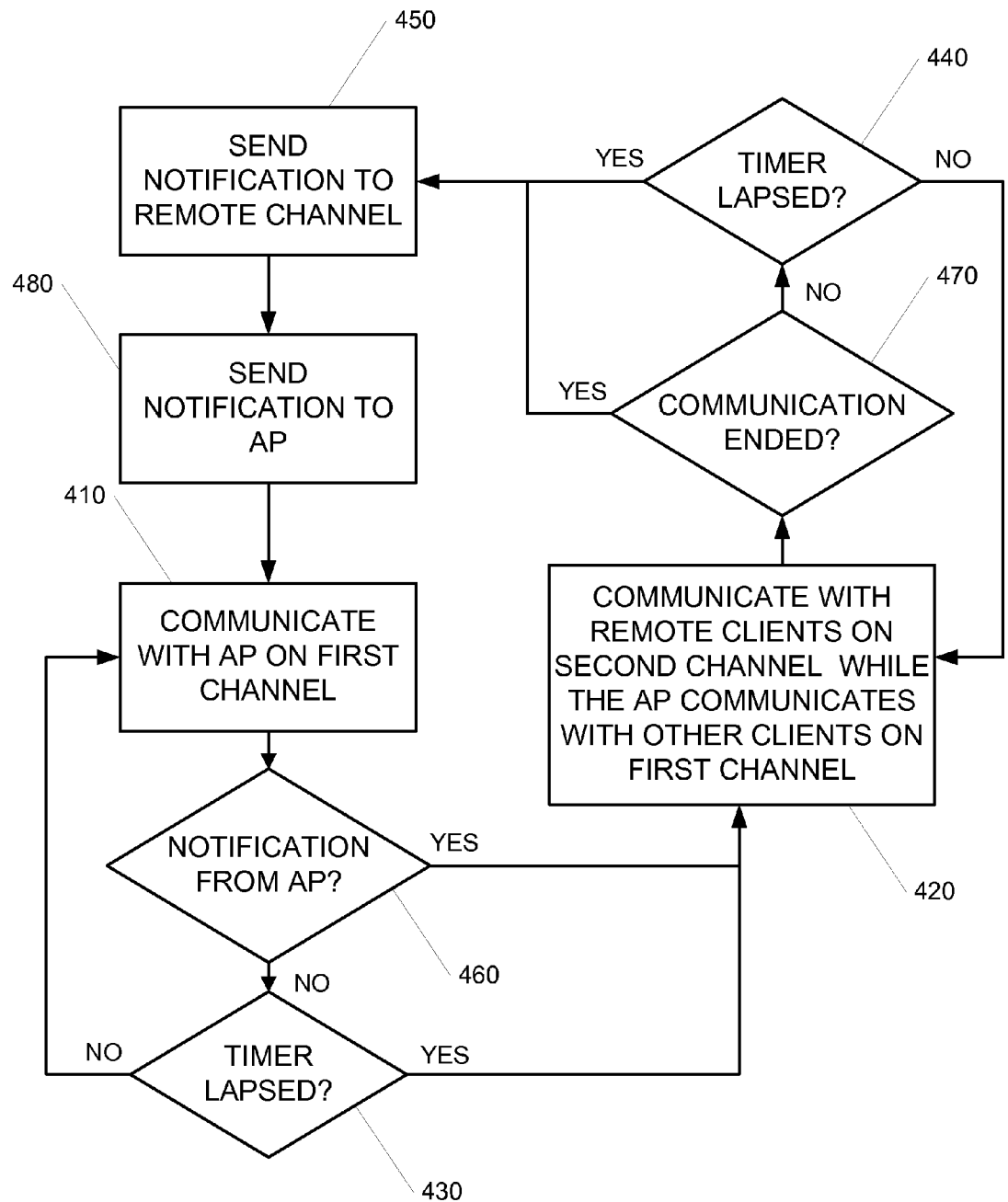
FIG. 4 is a flowchart illustration of a method for repeating data intended for a remote station by a repeater using handshake in a wireless communication system according to embodiments of the present invention.

Reference is made to FIG. 4, which is a flowchart illustration of a method for enhancing performance of a wireless communication system using repeater 130 using handshake according to embodiments of the present invention. In block 410, repeater 130 may communicate with AP 110 on RF channel 140, similarly to block 210 of FIG. 2. In block 460 repeater 130 may receive a notification from AP 110 that repeater 130 should hop to communicating with remote clients 124, 126 on RF channel 150. For example, AP 110 may signal that the queue is empty. If such a notification is not received for a predetermined time interval, repeater 130 may still hop to communicating with remote clients 124, 126 on RF channel 150, indicated as YES on block 430. Before hopping to communicating with remote clients 124, 126 on RF channel 150, repeater 130 may send a notification to AP 110, indicating repeater 130 is temporarily not receiving data on RF channel 140. For example, the notification may indicate to AP 110 that repeater 130 goes to power save mode. The power save notification may be compliant with various established wireless communication standards such as IEEE 802.11. Therefore, a standard compliant AP 110 may communicate with repeater 130 without substantially any modification of the standard protocols and be unaware of the forwarding function of repeater 130. Hence, in this case, AP 110 may be agnostic to the repeating operation, and repeater 130 may need to "impersonate" remote clients 124, 126 as if remote clients 124, 126 are associated with AP 110 in RF channel 140. In block 420 repeater 130 may communicate with remote clients 124, 126 over RF channel 150. AP 110 may communicate with clients 120 and 122 over RF channel 140 contemporaneously with the communication of repeater 110 with remote clients 124, 126. Repeater 130 may hop back to communicating with AP 110 after communication with remote clients 124, 126 temporarily ended, e.g. if the relevant queues have emptied, as indicated in block 470, or after a predetermined time interval, as indicated in block 440. Before repeater 130 hops back to RF channel 140, repeater 130 may send a notification to remote clients 124, 126 to notify remote clients 124, 126 that repeater 130 momentarily leaves RF channel 150, as indicated in block 450. In block 480, repeater 130 may notify AP 110 that repeater 130 is again ready to except data intended to remote clients 124, 126 on RF channel 140.

It should be readily understood that while FIGS. 2, 3 and 4 present a method utilizing a single repeater, the same methods may be easily augmented to support more than one repeater.

Referring again to FIGS. 1 and 4, assuming n=2 and m=1, AP 110 may serve two clients 120 and 122 in RF channel 140 and remote client 124 through repeater 130. Assuming a scenario in which the traffic needs of all three clients are equal, and hence t1=t2=t3, repeater 130 may communicate with AP 110 during 33% of the time, e.g. during time interval t3. During the rest 66% of the time, e.g. during time intervals t1 and t2, AP 110 may communicate with clients 120 and 122. Repeater 130 may communicate with remote client 124, for the same 66% of the time e.g. during time intervals t1 and t2. Since during the same time repeater 130 needs to deliver only half the traffic relatively to AP 110, the communication rate of repeater 130 may be half of the communication rate of AP 110. As known in the art, transmission at a lower rate can be sustained over longer reach than transmission at a higher rate, since the former requires less signal to noise ratio (SNR) or link budget. Therefore, transmitting at lower communication rate may increase the reach of repeater 130, and therefore the overall reach of wireless communication system 100. For example, assuming that AP 110 distributes two 20 Mbps HDTV streams, each to clients 120 and 122 and one 20 Mbps HDTV to remote client 124 through repeater 130, AP 110 may transmit an overall of 60 Mbps in 100% of the time, while repeater 130 may transmit 20 Mbps in 66% of the time, which is equivalent to transmission rate of 30 Mbps in 100% of the time. The load on repeater 130 may therefore be half the load on AP 110, which means that the reach of repeater 130 is increased compared with a reach of a repeater having a higher load.

According to embodiments of the present invention, repeater 130 may serve a plurality of remote clients. However, when serving more than one remote client, the available repeater bandwidth has to be divided among the plurality of remote clients. Alternatively, a single repeater may be used per each remote client. For example, if client 122 needs to be repeated as well, a second repeater may be added to wireless communication system 100. The second repeater may retransmit over RF channel different than RF channels 140 and 150. In this manner each repeater may, for example, repeat just one stream, and therefore may have half the load of AP 110, as described hereinabove.

Some embodiments of the present invention may be implemented in software for execution by a processor-based system, for example, repeater 130. For example, embodiments of the present invention may be implemented in code and may be stored on a non-transitory storage medium having stored thereon instructions which can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A wireless communication system comprising:
a repeater;
a remote client; and
an access point configured to communicate with at least two close clients, over a first RF channel, and with the remote client, via the repeater;
wherein the repeater is configured to communicate with the access point over the first RF channel and to communicate with the remote client over a second RF channel, wherein the first RF channel and the second RF channel are non-overlapping and
wherein the access point is configured to communicate simultaneously with the at least two close clients over the first RF channel while the repeater communicates with the remote client over the second RF channel,
wherein the repeater comprises a single radio unit, and wherein the repeater is further configured to communicate with the access point over the first RF channel and with the remote client over the second RF channel using the single radio unit, by time-domain multiplexing, and
wherein the repeater is further configured to transmit at a lower bit rate compared with the bit rate of the access point, wherein the lower bit rate is based on said time-domain multiplexing, thereby increasing a reach of the repeater.

2. The wireless communication system of claim 1, wherein the access point is configured to allocate the first RF channel and the second RF channel dynamically.

3. The wireless communication system of claim 1, wherein the access point is configured to allocate the first RF channel and the repeater is configured to allocate the second RF channel dynamically.

4. The wireless communication system of claim 1, wherein the access point is configured to allocate the first RF channel and the second RF channel to any free channels in a frequency band.

5. The wireless communication system of claim 1, wherein the first RF channel and the second RF channel are adjacent channels.

6. A method for enhancing performance of a wireless communication system, the method comprising:

communicating between an access point and at least two close clients over a first RF channel; and
communicating between an access point and a remote client via a repeater, the communication between the access point and the remote client via the repeater comprises:
communicating between an access point and the repeater over the first RF channel; and
communicating between the repeater and the remote client over a second RF channel wherein the first RF channel and the second RF channel are non-overlapping,
wherein the access point is configured to communicate simultaneously with the at least two close clients over the first RF channel while the repeater communicates with the remote client over the second RF channel,
wherein the repeater comprises a single radio unit, and wherein the repeater is further configured to communicate with the access point over the first RF channel and with the remote client over the second RF channel using the single radio unit, by time-domain multiplexing, and
wherein the repeater is further configured to transmit at a lower bit rate compared with the bit rate of the access point, wherein the lower bit rate is based on said time-domain multiplexing, thereby increasing a reach of the repeater.

7. The method of claim 6, comprising dynamically allocating the first RF channel and the second RF channel.

8. The method of claim 6, comprising allocating the first RF channel and the second RF channel, each to any free channel in a frequency band.

9. The method of claim 6, wherein the first RF channel and the second RF channel are adjacent channels.

10. The method of claim 6, comprising coordinating by the repeater with the access point moving from communicating by the repeater with the access point over the first RF channel to communicating by the repeater with the at least one remote client over the second RF channel.

11. The method of claim 6, comprising notifying the access point by the repeater that the repeater is in power save mode when the repeater moves from communicating with the access point over the first RF channel to communicating with the at least one remote client over the second RF channel.

12. A method for repeating a wireless signal in a wireless communication system, the method comprising:
communicating by a repeater with an access point over a first RF channel, comprising receiving from the access point data intended to a remote client, and forwarding data intended to the access point to the access point; and
communicating by the repeater with the remote client over a second RF channel, wherein the first RF channel and the second RF channel are non-overlapping, comprising receiving from the remote client the data intended to the access point and forwarding the data intended to the remote client to the remote client,
wherein communicating with the access point over the first RF channel and communicating with the remote client over the second RF channel are performed by the repeater in different time slots, and are performed by the repeater using a single radio unit,
wherein the repeater is further configured to communicate with the access point over the first RF channel and with the remote client over the second RF channel using the single radio unit, by time-domain multiplexing, wherein the access point is further configured to communicate simultaneously with at least two close clients while the repeater is communicating with the remote client, and wherein the repeater is further configured to transmit at a lower bit rate compared with the bit rate of the access point, wherein the lower bit rate is based on said time-domain multiplexing, thereby increasing a reach of the repeater.

13. The method of claim 12, wherein communication between the access point and an at least one close client over the first RF channel is substantially contemporaneous with the communication with the at least one remote client over the second RF channel by the repeater.

14. The method of claim 12, comprising coordinating with the access point moving from communicating by the repeater with the access point over the first RF channel to communicating with the at least one remote client over the second RF channel.

15. The method of claim 12, comprising notifying the access point that the repeater is in power save mode when the repeater moves from communicating with the access point over the first RF channel to communicating with the at least one remote client over the second RF channel.

16. The method of claim 12, comprising allocating by the repeater the second RF channel dynamically and allocating by the access point the first RF channel dynamically.

17. A repeater comprising:
a processor; and
a computer usable medium connected to the processor, wherein the computer usable medium contains a set of instructions for repeating a wireless signal in a wireless communication system, wherein the processor is designed to carry out a set of instructions to perform a method of:
communicating with an access point over a first RF channel, wherein communicating comprises receiving from the access point data intended to a remote client, and forwarding data intended to the access point to the access point; and
communicating with the remote client over a second RF channel, wherein the first RF channel and the second RF channel are non-overlapping wherein communicating comprises receiving from the remote client the data intended to the access point and forwarding the data intended to the remote client to the at least one remote client, wherein communicating with the access point over the first RF channel and communicating with the remote client over the second RF channel are performed by the repeater in different time slots, and are performed by the repeater using a single radio unit, wherein the repeater is further configured to communicate with the access point over the first RF channel and with the remote client over the second RF channel using the single radio unit, by time-domain multiplexing, wherein the repeater is configured to communicate simultaneously with the remote client while the access point is communicating with at least two close clients, and wherein the repeater is further configured to transmit at a lower bit rate compared with the bit rate of the access point, wherein the lower bit rate is based on said time-domain multiplexing, thereby increasing a reach of the repeater.

18. The repeater of claim 17, wherein communication between the access point and an at least one close client over the first RF channel is substantially contemporaneous with the communication with the at least one remote client over the second RF channel, by the repeater.

19. The repeater of claim 17, wherein the instructions when executed further perform a method of coordinating with the access point moving from communicating by the repeater with the access point over the first RF channel to communicating with the at least one remote client over the second RF channel.

20. The repeater of claim 17, wherein the instructions when executed further perform a method of notifying the access point that the repeater is in power save mode when the repeater moves from communicating with the access point over the first RF channel to communicating with the at least one remote client over the second RF channel.

21. The repeater of claim 17, wherein the instructions when executed further perform a method of allocating the second RF channel dynamically.

\* \* \* \* \*